(12) United States Patent
Tuft

(10) Patent No.: US 6,875,932 B2
(45) Date of Patent: Apr. 5, 2005

(54) PORTABLE PATIENT WEIGHING DEVICE

(75) Inventor: Richard H. Tuft, Wallingford, PA (US)

(73) Assignee: Millennium Medical Products, Inc., Broomall, PA (US)

( * ) Notice: Subject to any disclaimer, the term of this patent is extended or adjusted under 35 U.S.C. 154(b) by 111 days.

(21) Appl. No.: 10/241,744

(22) Filed: Sep. 11, 2002

(65) Prior Publication Data

US 2004/0049131 A1 Mar. 11, 2004

(51) Int. Cl.$^7$ ............................................. G01G 19/02
(52) U.S. Cl. .............................. 177/25.13; 177/25.19; 177/144; 177/199; 340/666
(58) Field of Search ................. 340/566, 144, 340/199, 200, 25.11–25.19

(56) References Cited

U.S. PATENT DOCUMENTS

| | | | | |
|---|---|---|---|---|
| 4,711,313 A | * | 12/1987 | Iida et al. .................... | 177/127 |
| 4,969,112 A | * | 11/1990 | Castle .......................... | 702/173 |
| 4,992,775 A | * | 2/1991 | Castle et al. ................. | 340/525 |
| 5,086,856 A | * | 2/1992 | Haggstrom ................... | 177/161 |
| 5,414,225 A | * | 5/1995 | Garfinkle ..................... | 177/199 |
| 5,994,649 A | * | 11/1999 | Garfinkle et al. ......... | 177/25.11 |
| 6,038,465 A | * | 3/2000 | Melton, Jr. ................. | 600/407 |
| 6,369,337 B1 | * | 4/2002 | Machiyama et al. ...... | 177/25.13 |
| 6,538,215 B2 | * | 3/2003 | Montagnino et al. ..... | 177/25.16 |
| 6,590,166 B2 | * | 7/2003 | Yoshida .................... | 177/25.13 |
| 6,649,848 B2 | * | 11/2003 | Kriger ....................... | 177/25.13 |
| 6,649,849 B2 | * | 11/2003 | Bass et al. ................ | 177/25.15 |

* cited by examiner

*Primary Examiner*—Randy W. Gibson
(74) *Attorney, Agent, or Firm*—Reed Smith LLP

(57) ABSTRACT

A system and method for measuring the weight of patients in a wheelchair are disclosed, including two portable weight measurement devices, wherein the devices measure the weight imposed on two wheels of a four wheel wheelchair, and a receiver that accepts weight measurement data from the portable weight measurement devices. The weight data exchanged between the two portable weight measurement devices and/or with the receiver may be transported over wireless connections.

11 Claims, 9 Drawing Sheets

PORTABLE PATIENT WEIGHING DEVICE

CROSS REFERENCE TO RELATED APPLICATIONS

N/A

BACKGROUND OF THE INVENTION

1. Field of the Invention

The invention relates to medical patient weighing, and, more particularly, to a portable device, system and method for weighing ambulatory and non-ambulatory patients.

2. Description of the Background

It is known that persons confined to a wheelchair often need to be weighed as part of a medical check up or follow-up. For many of these individuals, stepping off a wheelchair and onto a weight scale is difficult, or impossible, to accomplish. Consequently, weighing both the wheelchair and the patient, and subtracting the weight of the wheel chair, is a practical method of weighing. This practice has become commonplace. Such a simple procedure may, in fact, be quite involved, because the weighing device must accommodate the wheelchair, which generally requires ramps and a platform scale, for example. As such, wheelchair users ordinarily are weighed at a physician's office, hospital, nursing home, clinic, or the like, using a platform scale, which weighing, due to the inconvenience of the need to travel, may occur once a month or less. Such infrequent weighing renders weight control programs quite difficult to maintain. In addition to those using wheelchairs, often those requiring crutches or walkers must be seated in wheelchairs for weighing due to the difficulty in maintaining balance on an ordinary scale while utilizing crutches or a walker.

Due to the size of platform scales, platform scales are generally found principally in clinics, hospitals, nursing homes, or rehabilitation centers with a significant number of mobility-disabled patients. Consequently, physicians rarely have office platform scales, not only because such scales occupy a disproportionate amount of floor space in relation to usage, but also because, even with foldable ramps, such scales occupy valuable storage space. Although physician's weighing chairs may be available with built-in scales, those confined to wheelchairs may find it inconvenient or dangerous to be transferred between chairs for a procedure as routine as weighing.

In response to the deficiencies inherent in available weighing systems for the mobility disabled, portable weighing devices including two laterally displaced, electrically connected and rigidly aligned weighing modules have been developed. An example of one such system is documented in U.S. Pat. No. 5,414,225. The weighing device taught therein is designed for the conventional manually-operated wheelchair supported by two front caster wheels and two rear main wheels. A notable feature of the above-referenced device is the rigidly adjustable scissors-like adjustment between the two weighing pads. The rigidly adjustable pads must be pre-extended to the correct width of the wheelchair before use. A continuously variable width adjustment would be attractive because it permits easy last-minute adjustment of the weighing pads by an operator.

Additionally, it would be advantageous if a weighing scale could be utilized by both non-ambulatory and ambulatory patients, wherein ambulatory patients could step on the scales and be weighed without the use of the wheelchair, and wherein non-ambulatory patients may be pushed onto the same scale in a wheelchair. Thus, dual purpose weighing pads could be used for both purposes, and a smaller platform scale in a doctor's office setting would not be needed. Therefore, a need exists for a portable, fully adjustable wheelchair scale that can additionally serve as a substitute for a platform scale.

SUMMARY OF THE INVENTION

A system for measuring the weight of patients on a wheelchair includes two portable weight measurement devices, wherein the devices measure the weight imposed on two wheels of a wheelchair, and a receiver, wherein the receiver accepts weight measurement data from the portable weight measurement devices and wherein the weight data exchanged between the two portable weight measurement devices and/or the receiver is transported over wireless connections. The system may further include a medical record server interface, wherein the medical record server interface accepts patient weight data for storage into a patient record database.

A method of measuring and recording the weight of a patient on a wheelchair includes measuring the partial weight of an empty wheelchair by placing a front pair of wheelchair wheels on two portable weight measuring devices and sampling a first weight, measuring the partial weight of an empty wheelchair by placing a pair of rear wheelchair wheels on the two portable weight measuring devices and sampling a second weight, combining the first and second weight, and storing the combined first and second weight as the wheelchair weight, measuring the partial weight of a patient sitting in a wheelchair by placing the front wheels on the two portable weight measuring devices and sampling a third weight, measuring the partial weight of a patient sitting in a wheelchair by placing the rear wheels on the two portable weight measuring devices and sampling a fourth weight, combining the third and fourth weight, and storing the combined third and fourth weight as the patient and wheelchair weight, and subtracting the wheelchair weight from the patient and wheelchair weight to arrive at a patient weight.

Thus, the present invention provides a system and method for a portable, fully adjustable wheelchair scale that can additionally serve as a substitute for a platform scale.

BRIEF DESCRIPTION OF THE DRAWINGS

Understanding of the present invention will be facilitated by consideration of the following detailed description of a preferred embodiment of the present invention, taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical patient-safety device. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure hereinbelow is directed to all such variations and modifications to configurations for portable wheelchair scales as known, and as will be apparent, to those skilled in the art.

Figure 1A:
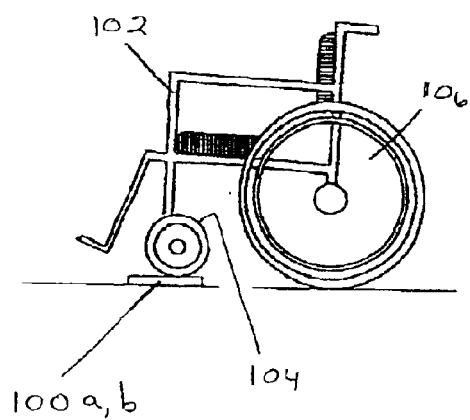
FIG. 1 is a side view of a wheelchair depicting the use of portable weighing devices.
Figure 1B:
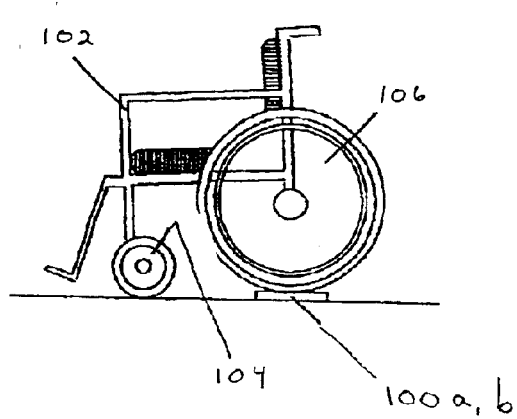

FIG. 1A shows a portable wheelchair weighing device 100a,b, deployed wherein the caster wheels 104 of a wheelchair 102 are first rolled up the integral ramps into a concave load cell portion of the weighing device. Portable wheelchair weighing device 100a,b may include two assemblies, wherein one assembly serves one of two wheels, and wherein each assembly integrates a load cell for loading of a wheel without rolling of the wheel once in place. In FIG. 1A, weighing device 100a is placed under one caster wheel 104, and device 100b is placed under a second caster wheel (not visible). FIG. 1B shows the portable wheelchair weighing device 100a,b deployed wherein each of the main wheels 106 of a wheelchair 102 are rolled up respective integral ramps onto the concave weighing device. The portions of the weight of the wheelchair supported by each wheel of the two front caster wheels, and the two rear main wheels may be successively summed and/or subtracted, or algorithmically calculated, or taken as a direct weight measurement wherein all four wheels are loaded simultaneously, for example. Further, the weight of the wheelchair, where known, may be entered into the weighing device manually, such as by typing on a keypad, or scanning a bar code on the wheelchair whereby the weight is evidenced, for subtraction from the weight measured with the patient and the wheelchair in combination on the weighing device. The weight of the occupant may thereby be calculated and stored or displayed.

Conventional wheelchairs are diverse with respect to dimensions, and these differences may affect weight readings. Critical dimensions for weighing include the wheelbase (longitudinal distance between caster and main wheel axes), center-of gravity (vertical distance between center of occupied wheelchair mass and floor level), and the tread (lateral distance between each of the caster wheels and between each of the main wheels). The effect of different wheelbases and different centers-of-gravity on weight readings may additionally depend on the tilt of the wheelchair when either the caster wheels or the main wheels are on the scale platform. As is well known in the art, if the height of the scale platform above floor level is less than a roughly 4 millimeters (0.16 inches) clearance, tilt errors can be discounted on weight readings. Consequently, scale platform heights above 4 mm are not discussed at length herein. However, it is well known by those of skill in the art that mathematical algorithms may be used to determine the correct weight if the height of the scale platform is greater than 4 mm.

Additionally, should the weighing device 100 incorporate multiple load cells non-simultaneously measuring, an effective weight measurement may utilize an algorithm. Such algorithms are discussed in U.S. Pat. No. 5,004,058 and U.S. Pat. No. 6,260,003 B1. Consequently, the current invention is not limited to a method of weight conversion utilizing a single load cell, or two load cells. Multiple load cells may also be utilized with an appropriate compensation in the calculation of patient weight, based on, for example, the type and number of load cells used in the portable weighing device.

For example, if a patient in a wheelchair is to be measured, a handheld controller may prompt the user to enter the wheelchair weight, such as by typing in the information or by scanning in the information which may be available on a bar coded sticker on the wheelchair, for example. Assuming that two portable weighing device scales are being used, the controller may prompt the user to place the front caster wheels of the empty wheelchair on the scales. The user may roll the front wheels of the wheelchair up the ramped transducers of the scale and allow the wheels to settle into the scale grooves for stability. A weight measurement of the front wheel weight may be taken by activating the appropriate control of the handheld unit. The controller may then prompt the user to remove the front wheels and place the rear or main wheels of the wheelchair on the transducers in the same manner as the front wheels. A weight measurement of the rear wheels may then be taken by activating the appropriate control on the handheld unit, and the total weight may then be calculated using an algorithm. Naturally, if the weight of the wheelchair is already known, then the weighing of the empty wheelchair is unnecessary.

Next, the weight of the patient seated in the wheelchair may be taken. The handheld controller may prompt the user to place the front wheels of the occupied wheelchair on the transducers. The occupied wheelchair may be rolled up onto the transducer ramps, and the front wheels may be placed into the transducer grooves for added stability, in addition to, for example, locking the front wheels. A front wheel measurement of the occupied wheelchair may be taken when the user activates the appropriate control of the handheld unit. The wheelchair may then be rolled off the transducers, turned around, and the rear wheels rolled up the transducer ramp and into the grooves of the transducers for a measurement, and the total weight may then be calculated algorithmically If an ambulatory patient is to be weighed, the user may place covers over the wheel grooves on the transducers, if present, for example, and then may initialize the weighing devices with the handheld controller. The walking patient may stand directly on the transducers, and a direct patient weight may be taken when the user activates the appropriate control on the handheld controller.

Figure 2:
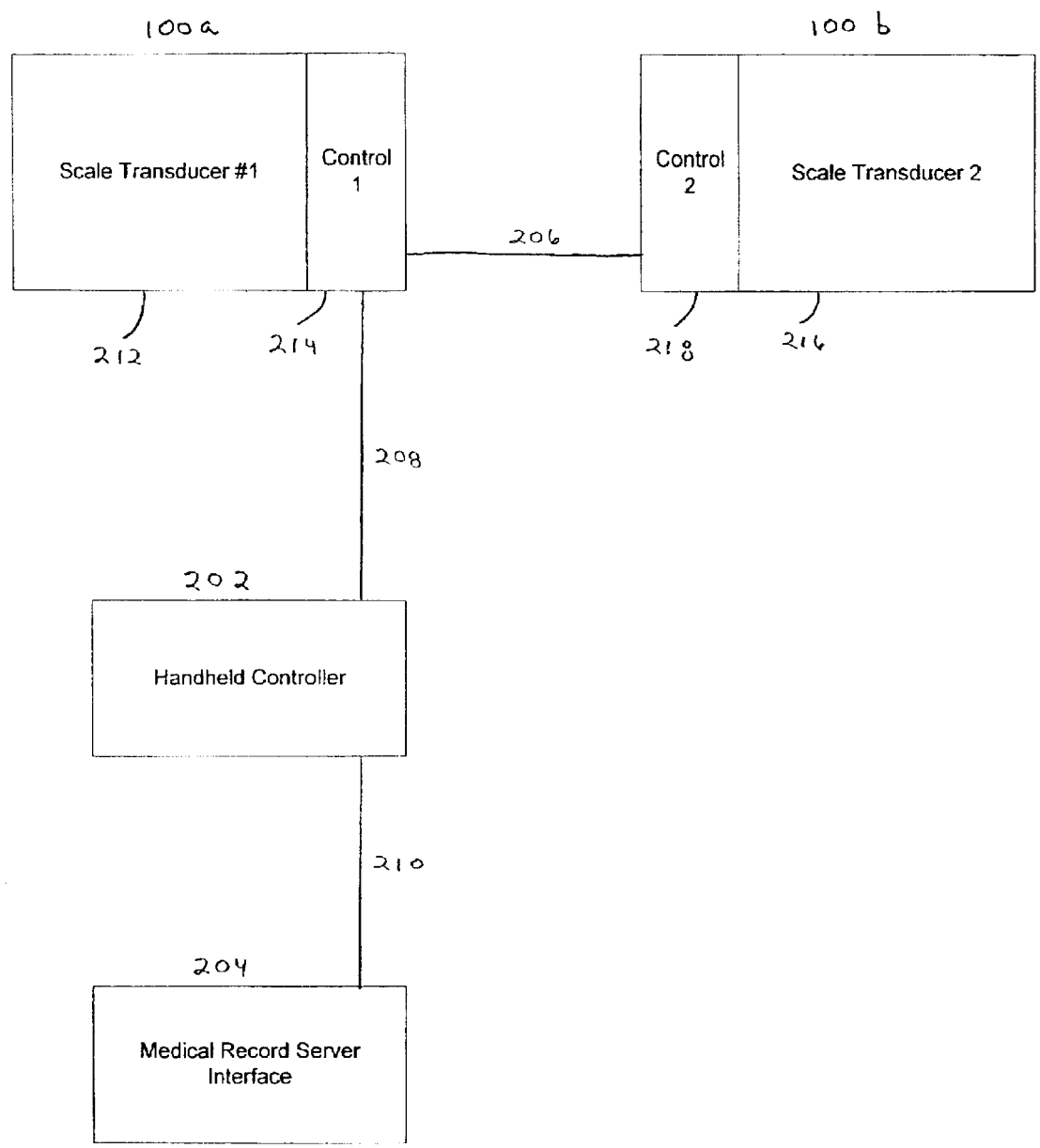
FIG. 2 is a block diagram of an embodiment of the present invention.

FIG. 2 is a block diagram illustrating an embodiment of the present invention utilizing portable weighing device 100a, b, in conjunction with a receiver of weight data, which receiver may include a controller 202 and/or a Medical Record Server Interface. The controller 202 may be a handheld controller 202, such as, for example, an electronic controller, a PDA, a handheld computer, or the like, or may be any controller known to those skilled in the art, such as a PLC or computer. Medical record server interface may be, for example, a network interface, such as a wired or wireless interface to a network server, such as a medical record server on which medical records, such as patient weights, are stored. The controller 202 may be included in, or exclusive of, the medical record server interface. The portable weighing devices 100a,b may each include a transducer scale portion and a control portion, for example. The transducer scale portion may include a load cell portion, as discussed hereinabove, to prevent rolling of a wheel of a wheel chair. Alternatively, the transducer portion may include thereon, or in proximity therewith, a wheel lock to lock the wheels to prevent rolling. Alternatively, the load cell portion may include a shape correspondent to the bottom of a human foot, to allow an ambulatory patient to stand on, for example, one or two of the transducers, and to allow for the taking of a weight measurement therefrom. In these exemplary embodiments, the handheld controller may allow an operator to input the weight-taking methodology, such as "standing patient", "2 wheels of chair", or "4 wheels of chair", to allow for a correspondent adjustment in algorithms used to generate the weight measurement. Any number of transducers and load cells may be employed correspondent to wheelchairs having differing numbers of wheels, such as three or four wheeled wheelchairs, as will be apparent to those skilled in the art.

Figure 3:
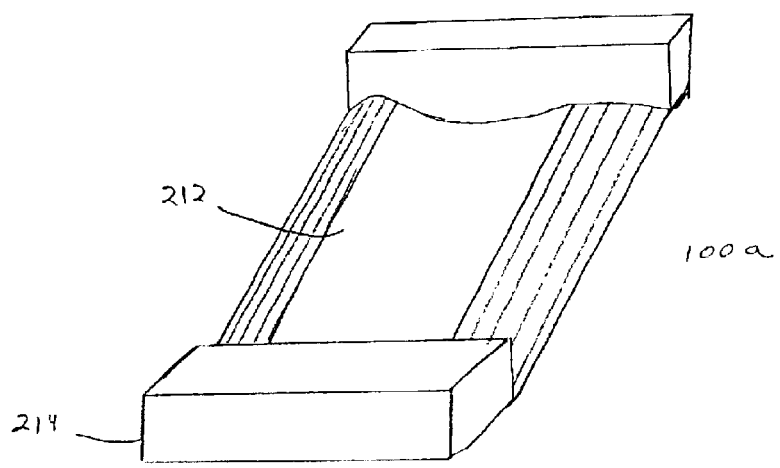
FIG. 3 is a depiction of a portable weighing device.
Figure 3:
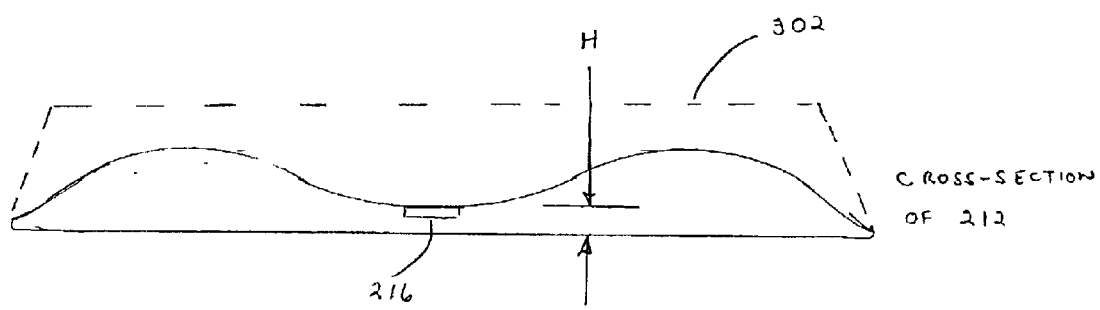

An exemplary scale transducer portion 212 of the portable weighing device 100a is depicted in FIG. 3a. The transducer portion may include an integral ramp shape, as well as one or more transducers 216 positioned in a manner apparent to those of skill in the art to accurately measure stress/strain as an indicator of weight. FIG. 3b depicts an exemplary cross section of the integral ramp of the transducer assembly 212. With respect to FIG. 3B, height H may be 4 mm or less in height if no correction due to the tilt of the wheelchair is to be made within the controller 214 portion of the portable weighing device 100a, as discussed hereinabove.

Returning now to FIG. 2, portable weighing devices 100a and b may be interconnected via cable 206 between transducers 212, 216, such as between transducer controllers 214 and 218. Cable 206 may permit the communication of weight data from controller 2 218 to controller 1 214, for example. Alternately, controller 2 218 may interface directly with the handheld controller 202, such as by a cable, to provide the same connectivity that controller 1 214 has with the handheld controller 202 via cable 208.

The handheld controller 202 may permit the monitoring and control of the weighing operation, as set forth hereinabove. Handheld controller may include an internal controller or processor running software thereon, thereby enabling the controller to display instructions to the user, and to display, for example, the results of the weight measurement. In the exemplary embodiment of FIG. 2, the handheld controller 202 may include interfaces for the reception of controller 1 and controller 2 data via cable 208. The handheld controller 202 may format the data for reception by the medical record server interface 204 via cable 210, for example. Alternatively, data may be stored within the transducers 212, 216 or controllers 214, 218 for later download, or may be downloaded directly to the medical record server interface from the controllers 214, 218. Cables 208 and 210 may be any hardwire interface commonly known to those of skill in the art, such as a twisted pair, a shielded twisted pair, coaxial cable, or optical cable, for example.

The Medical Record Server Interface 204 of FIG. 2 may be connected, such as via an interface 210, such as a cable interface 210, to the handheld controller. This interface may allow the weight data of a patient to be uploaded to the patients medical records. This interface may take other forms, such as wireless, infrared, radio frequency, or the like, for example.

Figure 4:
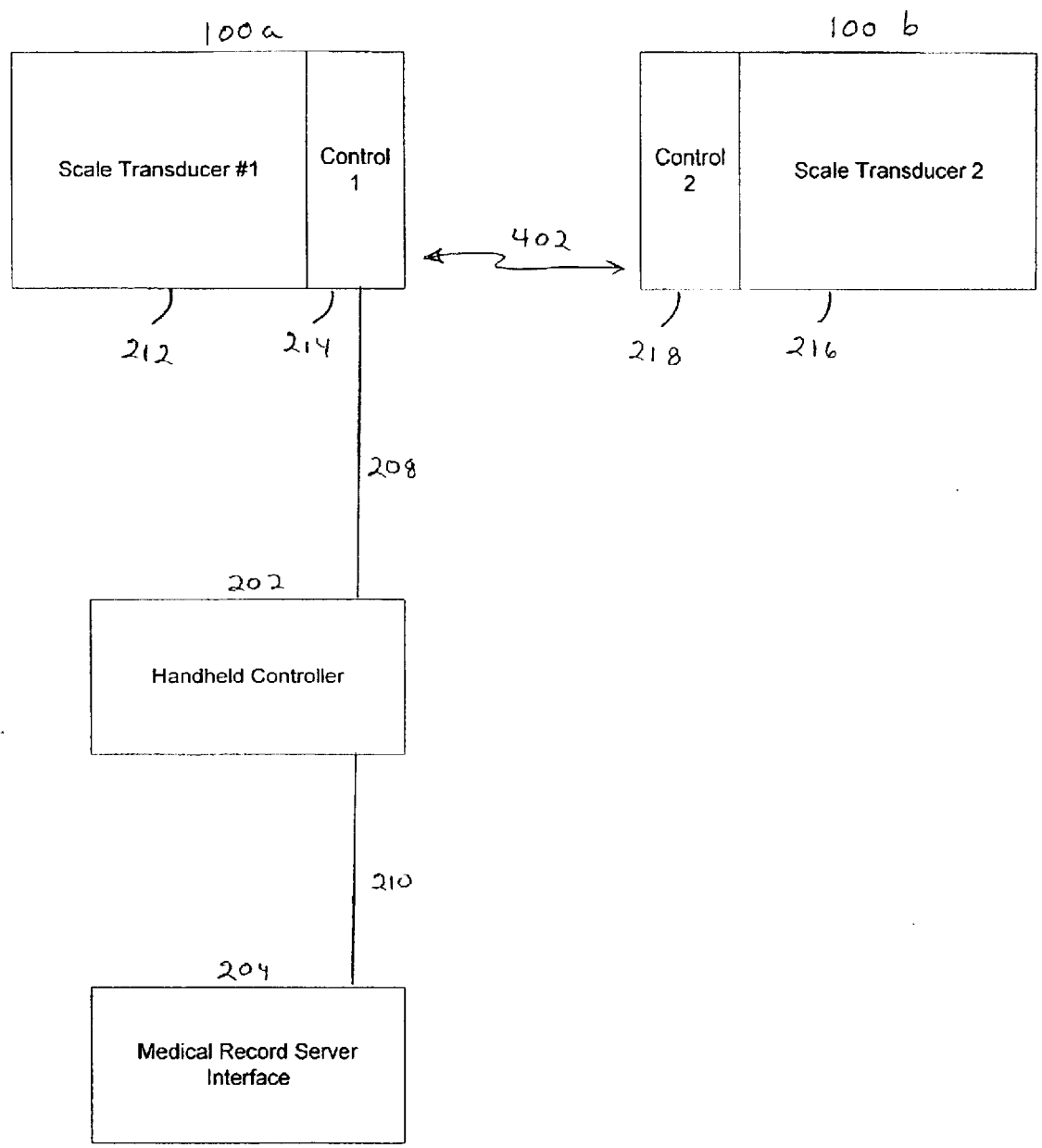
FIG. 4 is a block diagram of an embodiment of the present invention.

FIG. 4 is a block diagram illustrating an embodiment of the present invention, wherein a wireless interface is utilized between controller 1 and controller 2 of the portable weighing devices 100a,b. The wireless interface may be any interface known to those skilled in the art, such as an RF interface or an infrared interface. The interface may be bi-directional in that controller 1 may query controller 2 to request the most recently acquired weight data, and controller 2 may then respond to the data request by providing the weight data sample to controller 1. Alternatively, controller 2 may provide data without a request from controller 1. Controller 1 may package both controller 1 and controller 2 data for transmission to the handheld controller 202, or may transmit the combined data directly to the record server interface 204, such as for storage or calculation.

The wireless interface 402 may include an RF interface, wherein the transmit and receive frequencies of controller 1 or controller 2 are preferably sufficiently different such that insignificant interference is encountered, as will be apparent to those of skill in the art. Alternatively, the transmit and receive frequencies may be identical, but may employ the use of pseudorandom noise codes for spread spectrum communications, or time division multiple access, for example, as will be apparent to those of skill in the art. The use of PN codes may additionally reduce the chance of an external noise source having an adverse effect on system compatibility, such as electrical device noise in a medical or office setting. Alternatively, addressing may be used to differentiate between signals on the same frequency, as will be apparent to those skilled in the art.

Figure 5:
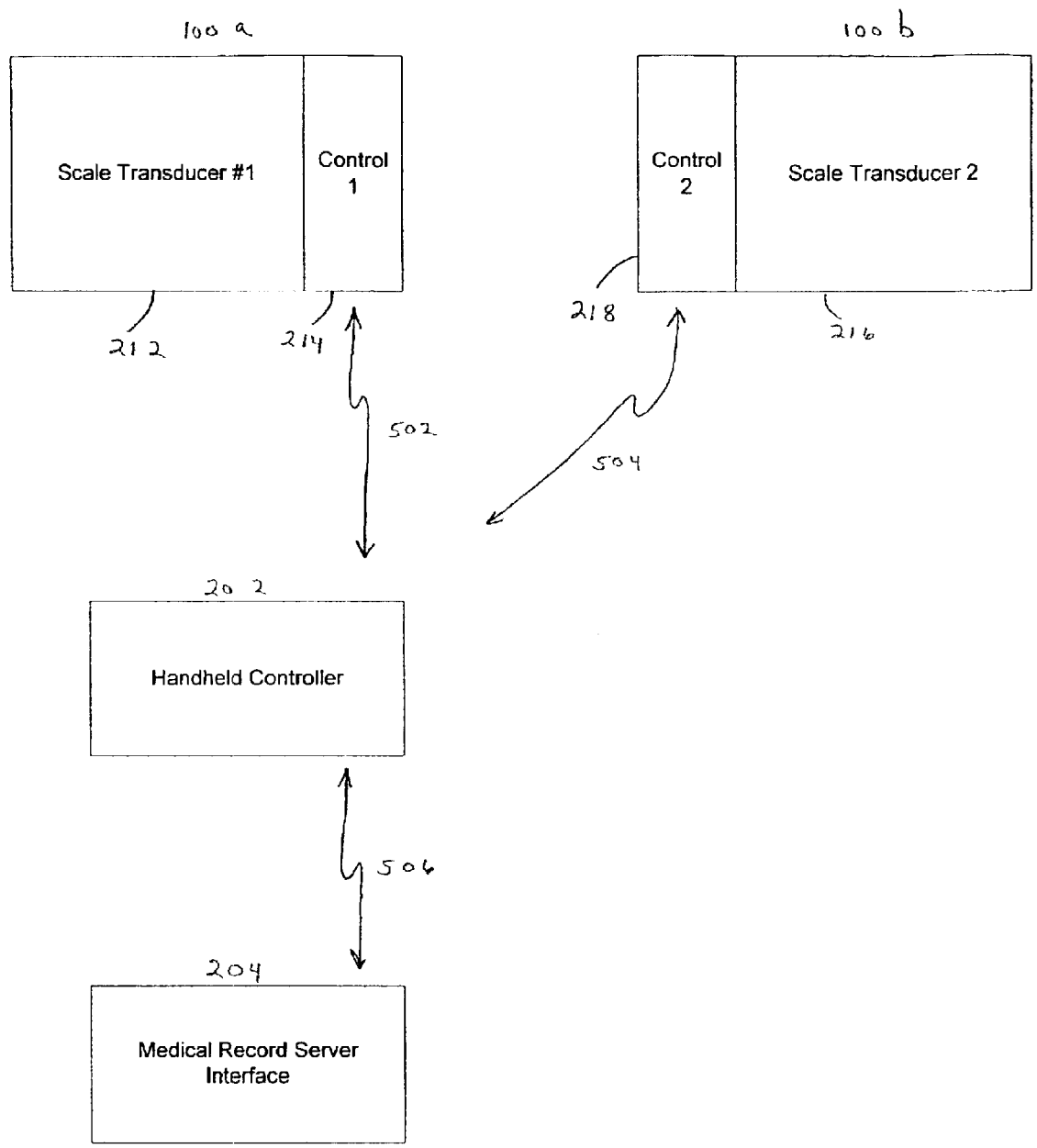
FIG. 5 is a block diagram of an embodiment of the present invention.

FIG. 5 is a block diagram illustrating an embodiment of the present invention wherein an interface, such as a wireless interface, may be utilized between controller 1 and controller 2 of the portable weighing devices 100a,b, and wherein a wireless interface may be utilized between at least one of controllers 1 and 2 and the handheld controller 202 or the record server interface 204. The wireless interface(s) 502 and/or 504 and/or 506 may be any wireless interface known to those skilled in the art, such as an RF interface or an infrared interface. The interface(s) may be bi-directional in that the handheld controller 202, or the record server interface, may query controller 1 and controller 2 to request the most recently acquired weight data. Controllers 1 and 2 214, 218 may then respond to the data request by providing the weight data samples to the handheld controller 202 or record server interface. Alternatively, controller 2 may communicate wirelessly, or via wired connection, with controller 1, and controller 1 may communicate the data from controllers 1 and 2 wirelessly to one of the handheld controller or the medical record server interface.

The wireless interfaces 502 and/or 504 may include an RF interface wherein the transmit and receive frequencies of controller 1 and controller 2 are sufficiently different, such that insignificant interference is encountered as will be apparent to those of skill in the art. Alternatively, the transmit and receive frequencies may be identical between controller 1 214 and/or 2 218 and/or the handheld controller 202, but may employ the use of pseudorandom noise codes for spread spectrum communications, or time division multiple access, for example, as is known to those of skill in the art. The use of PN codes may reduce the chance of an external noise source having an adverse effect on system compatibility in the medical or office setting. Alternatively, addressing may be used to differentiate between signals, as will be apparent to those skilled in the art.

Wireless interface 506 may be used to transmit the sampled weight data from a handheld controller 202 to the medical record server interface 204. Alternatively, as set forth hereinabove, the sampled weight data may be transmitted directly to the record server interface 204 from the controllers 1 and/or 2.

Figure 6:
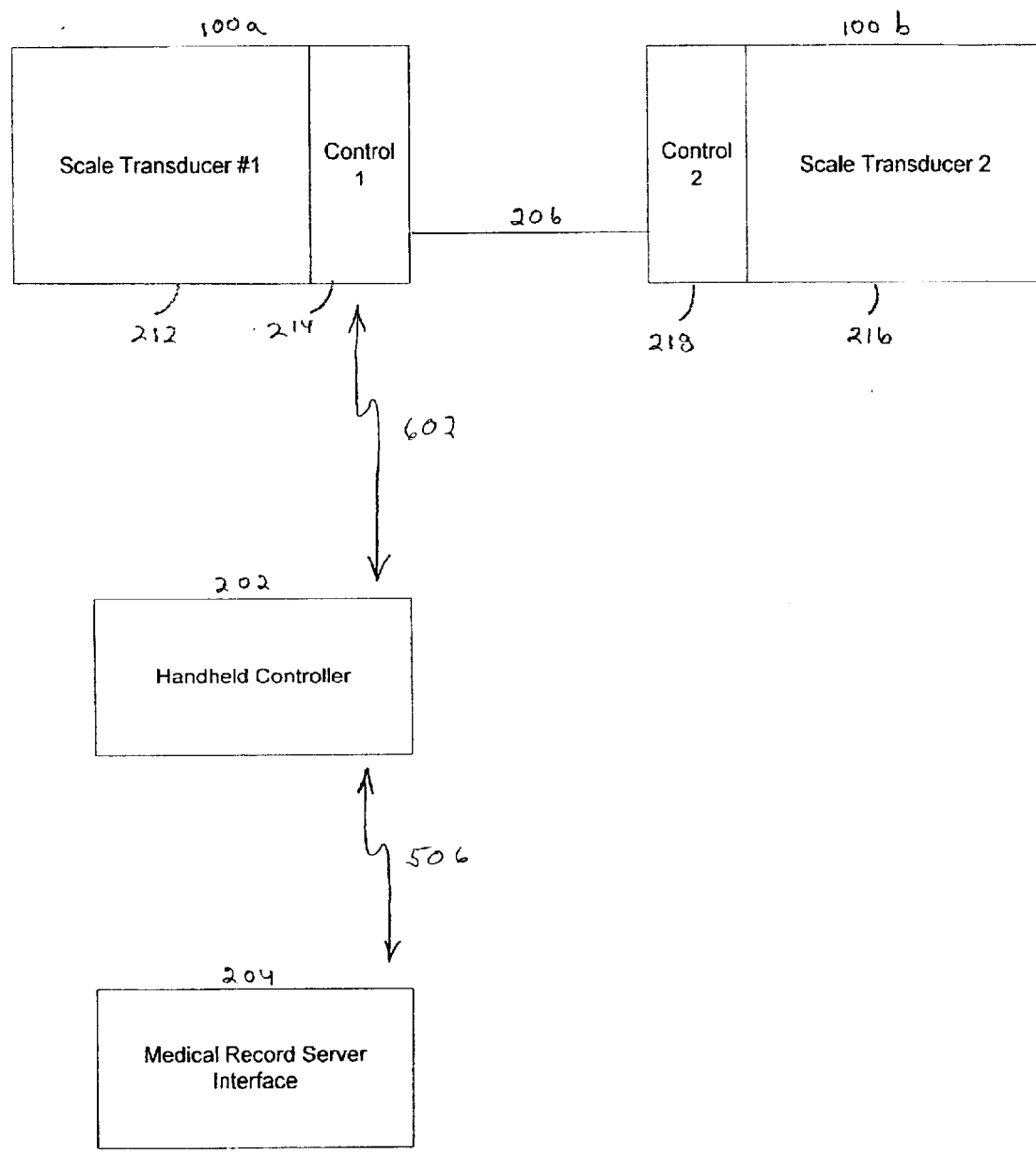
FIG. 6 is a block diagram of an embodiment of the present invention.

FIG. 6 is a block diagram illustrating an embodiment of the present invention, wherein a wireless interface is utilized between controller 1 of the portable weighing devices 100a,b and the handheld controller 202 or record server interface. The wireless interfaces 602 and/or 506 may be any interface known to those skilled in the art, such as an RF interface or an infrared interface. The interface may be bi-directional in that the handheld controller 202, or record server interface 204, may query controller 1 to request the most recently acquired weight data. Controller 1 214 may then query controller 2 218 for the most recently acquired weight sample data.

Figure 7:
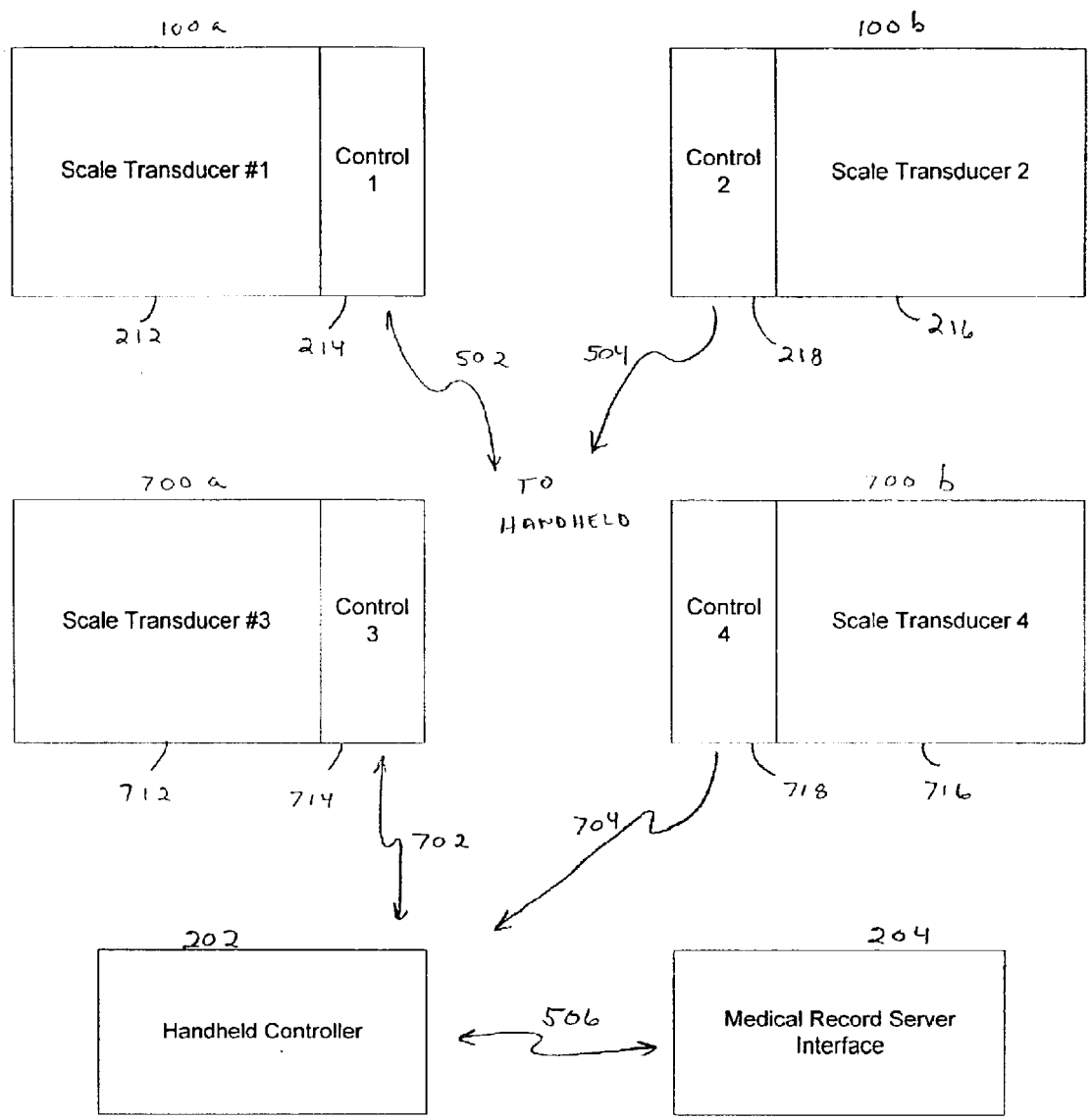
FIG. 7 is a block diagram of an embodiment of the present invention.

FIG. 7 illustrates an embodiment of the present invention wherein four portable weighing devices 212, 216, 712, 716 are utilized simultaneously. This configuration allows the weighing of a patient on a wheelchair, a standard chair, or even a bed. In the FIG. 7 configuration, each portable weighing device is preferably similar in function to the portable weighing devices discussed hereinabove. The four portable weighing devices may differentially weigh a wheelchair, and the patient therein, without using mathematical algorithms, other than subtraction of the weight of the wheelchair, to generate the patient weight. The four portable weighing devices may include communications interfaces, wherein it may be necessary to have differences in frequencies to accommodate the electromagnetic compatibility of a wireless embodiment of the system, as set forth hereinabove. In one embodiment, all four portable weighing devices may thus transmit and receive on different frequencies. The handheld controller may accommodate the wired, or the wireless, transmission and reception of the four different receive/transmit channels.

In an additional embodiment, all four portable weighing devices 100a,b and 700a,b may receive on the same frequency, such as the transmit frequency of the handheld controller. Additionally, the four portable weighing devices 100a,b and 700a,b may transmit on the same frequency, such as the receive frequency of the handheld controller. The transmit and receive frequencies of the handheld controller may be appropriately divergent to allow for electromagnetic compatibility, as is well known by those of skill in the art. The handheld controller 202 may issue commands to the portable weighing devices individually, such as via digital addressing of the portable weighing devices, and each device may respond by providing a weight sample back to the handheld controller 202, for example. Such an exemplary embodiment may utilize a single transmit and receive frequency for all four weighing devices, wherein each device is assigned a unique address, and wherein the handheld controller interfaces uniquely, via the addressing, to each of the four devices. Contention for frequency use may additionally be eliminated by time division data traffic control of the handheld controller 202, such as time division multiplex control by the handheld controller, for example, or by frequency division, as set forth hereinabove. The frequencies of transmission and/or reception between the handheld controller 202 and the medical record server interface 204, depicted as link 506 in FIG. 7, may be different from the frequencies used by the portable weighing devices 100a,b and 700a,b, as will be apparent to those skilled in the art.

Figure 8:
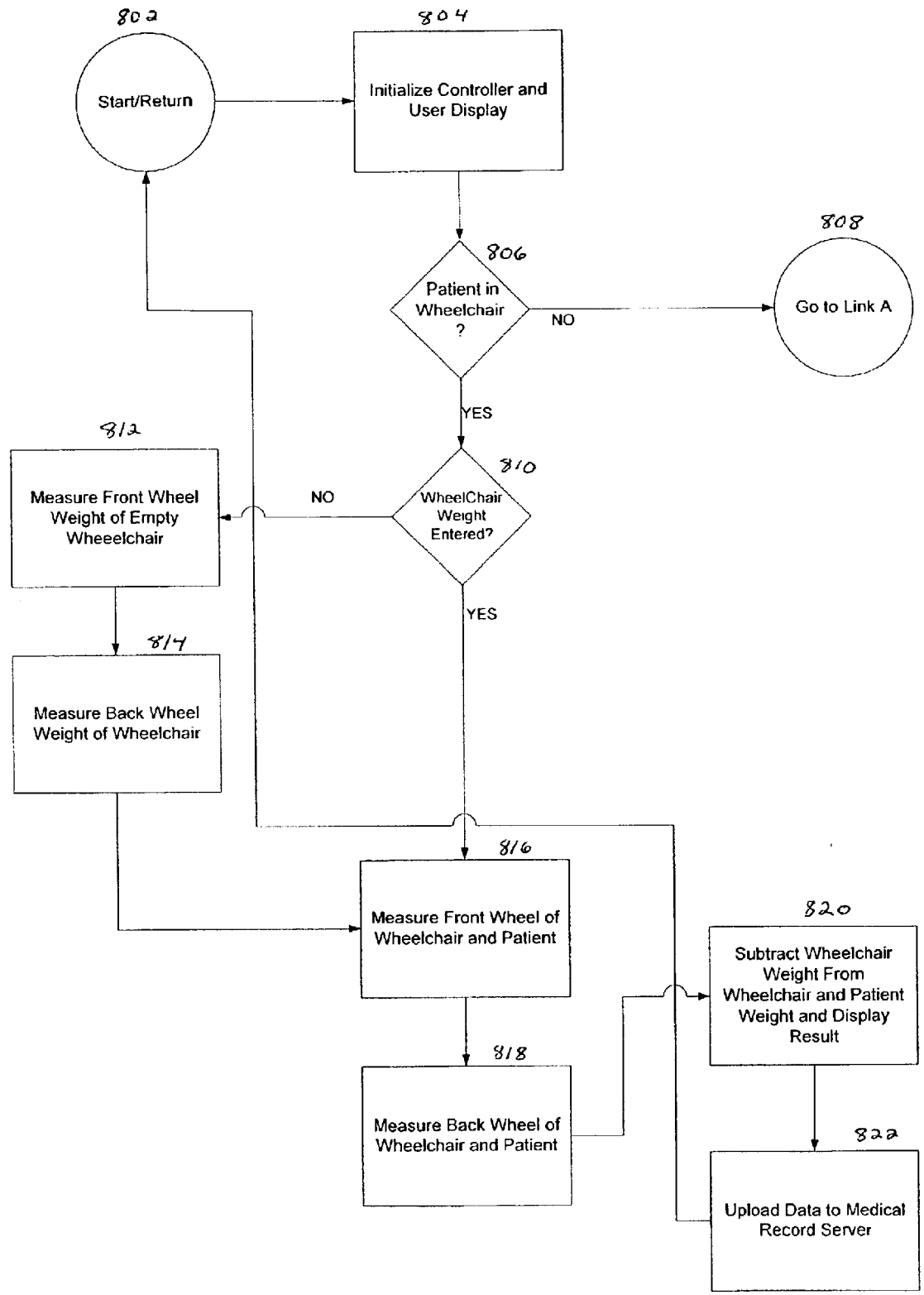
FIG. 8 is a flow diagram of an aspect of the present invention.

FIG. 8 is a flowchart illustrating a process in an embodiment of the present invention utilizing two portable weighing devices, such as illustrated in, for example, FIGS. 2, 4, 5, and 6. The process may be started at step 802, such as by the user, such as an operator of the handheld controller, starting a new measurement 804.

After initialization 804, the user is queried as to whether the patient will be weighed with a wheelchair. If the user indicates that the patient will be weighed in a wheelchair, step 810 queries whether the wheelchair weight was previously entered, or is known. If the wheelchair needs to be weighed, step 812 prompts the user to place the front caster wheels of the empty wheelchair on the scales. A weight measurement is taken of the empty wheelchair by the portable weighing devices and reported back to the handheld controller. Next, the weight of the back or main wheels of the wheelchair may be measured 814 by prompting the user to place the wheelchair main wheels on the portable weighing pads.

Note that if the wheelchair measurement is already entered, or is known by the user, the program may skip from step 810 to step 816 and start the patient weighing process directly. At step 816, the handheld controller may prompt the user to place the front wheels of the occupied wheelchair on the portable weighing device for a measurement of the patient weight. Once the measurement is taken, the handheld controller displays to the user the request to place the main wheels of the occupied wheelchair on the portable weighing devices in order to continue patient weighing 818. Thereby, the final total weight is generated.

The known weight of the wheelchair is subtracted from the total weight measured at step 820, and the weight of the patient is thereby provided to the medical server at step 822. The patient weight may be displayed to the user, and the process may return to the idle state at step 802.

Figure 9:
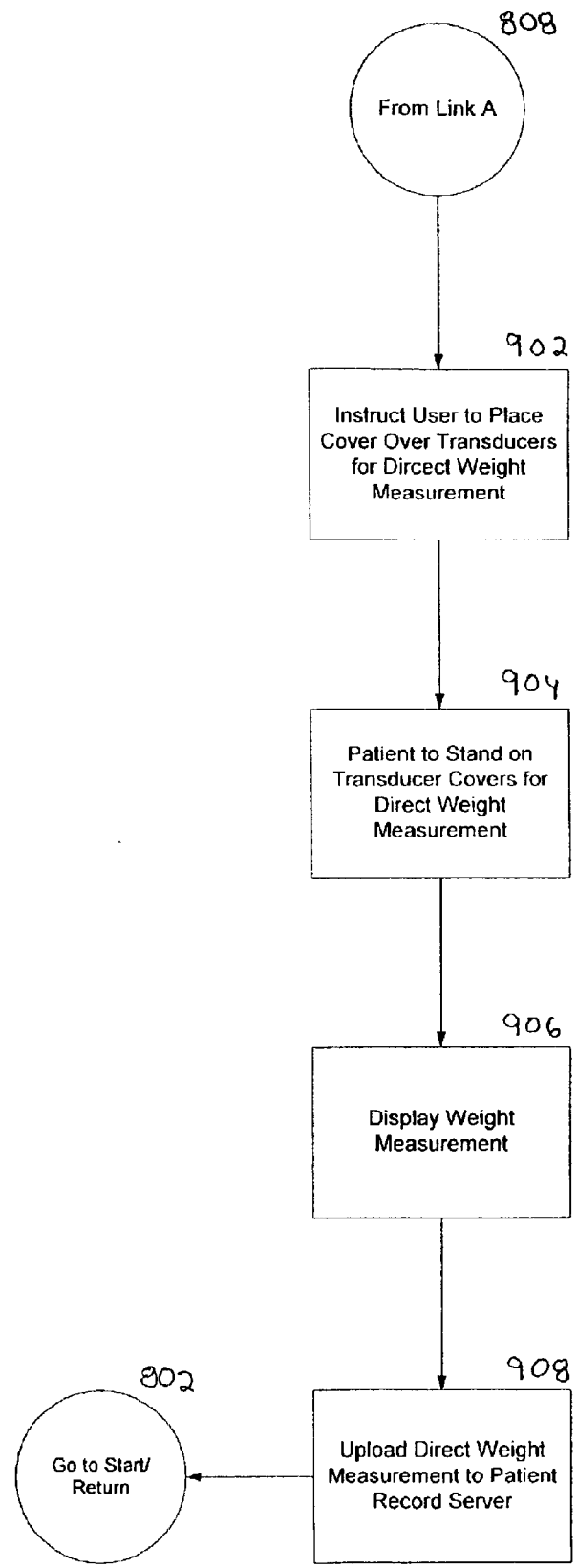
FIG. 9 is a flow diagram of an aspect of the present invention.

If an ambulatory patient is to be weighed, the process may allow the user to directly weigh the patient via link 808 in FIG. 8. With reference to FIG. 9, the handheld controller may instruct the user to place a cover over the wheelchair wheel depression, in an embodiment wherein the load cell is not shaped to accept a human foot, which allows the portable weighing device to directly measure the weight applied to the cover. Thus, an ambulatory patient may step directly onto the portable measuring devices and be weighed without the use of a wheelchair.

If need be, the covers are in place at step 902, and the patient stands on the transducer of the portable weighing devices and is weighed directly. Step 906 displays the weight to the user. Step 908 allows uploading of the measurement directly to a patient record server interface. Once the data is transferred, the handheld controller may be placed in the idle state at step 802.

It will be apparent to those skilled in the art that various modifications and variations may be made in the apparatus and process of the present invention without departing from the spirit or scope of the invention. For example, in each of the embodiments set forth hereinabove, the weight of a patient may be digitally displayed, preferably in real time, on the handheld controller, on a nearby computer, or on the load cells, and may be displayed in any applicable weight measure type, such as lbs. or kgs. Further, in each of the embodiments set forth hereinabove, the weighing system may have a power saving mode, such as wherein the system powers down after a specified time of non-use, such as 10 minutes, for example. Thus, it is intended that the present invention cover the modification and variations of this invention provided they come within the scope of the appended claims and their equivalents.

What is claimed is:

1. A system for measuring weight of at least one patient in a wheelchair, comprising:

at least two portable weight measurers, wherein each of said weight measurers is corresponded to a weight imposed on a corresponded one of at least two wheels of the wheelchair, and wherein a first of the corresponded weights from a first of the at least two weight measurers is accumulated at a second of the at least two weight measurers with a second of the corresponded weights into an accumulated weight measure for subtration therefrom of a weight of a wheelchair to provide a weight of at least one patient;

a receiver, wherein said receiver receives the accumulated weight measure from at least the second of the at least two weight measurers; and a wireless communicative connection that connects each of the at least two portable weight measurers to allow for the accumulated weight measure, wherein one of said at least two weight measurers is substantially elastically coupled to at least one other of said at least two weight measurers.

2. The system of claim 1, wherein said wireless communicative connection is at least one selected from the group consisting of a radio frequency interface and an infrared interface.

3. The system of claim 2, wherein said radio frequency interface comprises a single transmit and receive frequency, and wherein isolation of data flow between said portable weight measurers comprises at least one selected from the group consisting of pseudorandom noise codes, data addressing, and time division multiplexing.

4. The system of claim 1, wherein said receiver comprises a medical record server interface, wherein said medical record server interface accepts the accumulated weight measure for storage in at least one patient record database.

5. The system of claim 4, wherein said receiver further comprises a controller, wherein said controller accepts the accumulated weight measure for forwarding to at least one patient record database.

6. The system of claim 5, further comprising a receiver interface between said controller and said medical record server interface.

7. The system of claim 1, further comprising a wireless interface between at least the second of the at least two portable weight measurers and the receiver.

8. The system of claim 1, wherein each of said at least two portable weight measurers comprises at least one transducer.

9. The system of claim 8, wherein each of said at least two portable weight measurers further comprises at least one transducer controller.

10. A system for measuring weight of at least one patient in a wheelchair, wherein the wheelchair includes at least two front wheels and two rear wheels, comprising:

two portable weight measurers, wherein each of said weight measurers is corresponded to a weight imposed on a corresponded one of two wheels of the at least two front wheels and two rear wheels, and wherein a first of the corresponded weights from a first of the two weight measurers is accumulated at the second of the weight measurers with a second of the corresponded weights to generate an accumulated weight measure;

a wireless communicative connection that connects each of the two portable weight measurers to allow for the accumulated weight measure; and a calculator that calculates the weight of the at least one patient in accordance with a summation of a first of the accumulated weight measure correspondent to a wheelchair not having the at least one patient therein and a second of the accumulated weight measure correspondent to the wheelchair having the least one patient therein wherein one of said two portable weight measurers is substantially elastically coupled to the other of said two portable weight measurers.

11. A method of measuring and recording the weight of a patient on a wheelchair, comprising:

sampling at least a first partial weight of the patient sitting in the wheelchair by placing a first wheel of the wheelchair on a first portable weight measurer;

sampling at least a second partial weight of the patient sitting in the wheelchair by placing a second wheel of the wheelchair on a second portable weight measurer;

sampling a wheelchair weight of the wheelchair without the patient therein;

wirelessly communicating the first partial weight to the second portable weight measurer;

accumulating the first partial weight and the second partial weight;

calculating the weight of the patient in accordance with said accumulating and a subtracting of a wheelchair weight from said accumulating; and transmitting the weight the patient to a patient record storage.

* * * * *